2,955,135

METHOD OF RESOLVING DL-THREONINE

Gaston Amiard, Noisy-le-Sec, Robert Joly, Montmorency, and Leon Velluz, Paris, France, assignors to Les Laboratoires Francais de Chimiotherapie, Paris, France, a body corporate of France No Drawing. Filed Nov. 17, 1953, Ser. No. 392,768

Claims priority, application France Mar. 4, 1953

5 Claims. (Cl. 260—534)

This invention relates to a process of resolving DL-threonine into its optically active components.

Threonine or threo-2-amino-3-hydroxy butyric acid exists in two optically active or enantiomorphic forms, namely the D(+)-form and the L(−)-form. Only the L(−)-form can be utilized by the organisms. It is one of the essential amino acids which are indispensable to the animal organism and cannot be synthesized by the same. The preparation of said L(−)-threonine consequently is of great interest since this amino acid serves on the one hand as supplement for proteins which are poor in or totally deficient of threonine, and on the other hand in the synthesis of polypeptides containing said amino acid. The known synthetic processes of producing threonine, however, yield only DL-threonine, i.e., the racemic form of said amino acid. To produce L(−)threonine requires resolution of said racemic reaction product into its optically active components.

Heretofore, such resolution was effected by producing the brucine salt of the N-p-nitro benzoyl derivative of said threonine. This process, however, requires much time and is quite expensive because first the N-p-nitrobenzoyl threonine must be prepared and the rather expensive alkaloid brucine must be used as an auxilliary substance for such resolution.

It is one object of this invention to provide a simple, effective, and inexpensive method of resolving DL-threonine and of separating its enantiomorphic forms so as to produce the valuable L(−)-threonine. Said process does not require the formation of an intermediate derivative such as the N-p-nitro benzoyl derivative but yields directly L(−)-threonine in a good yield and within a short period of time.

Other objects of this invention and advantageous features thereof will become apparent as the description proceeds.

The present invention, in principle, is based on the fact that the optically active or enantimorphic components of threonine exhibit in aqueous or aqueous-alcoholic solution the phenomenon of super-saturation whereby the one enantiomorphic component influences the solubility of the other enantiomorphic component and vice versa. Therefore, addition of a slight excess of the one enantiomorphic component over the other enantiomorphic component to a solution of both enantiomorphic components increases considerably supersaturation of said enantiomorphic component in the solution so that it selectively precipitates as soon as the temperature is decreased. For instance, when adding to a warm solution of the racemic mixture a small quantity of one of the enantiomorphic components and thereafter cooling said solution, a larger quantity of said added enantiomorphic component crystallizes as had been originally added. In this manner direct resolution of the racemic mixture is achieved.

The process according to the present invention, therefore, consists in preparing a warm solution of racemic threonine in water or aqueous alcohol. The concentration of racemic threonine in said solution is such that as large a quantity of said racemic mixture as possible remains in supersaturated solution on cooling, thereby producing a non-precipitating, non-crystallizing maximum supersaturated solution at room temperature. To said solution supersaturated in the cold, a comparatively small amount of one of the enantiomorphic components is added while at elevated temperature, said amount disturbing, on cooling the solution, the equilibrium of the enantiomorphic components in the cooled solution and causing crystallization of the enantiomorphic component that was added thereto, in an amount exceeding said added amount. The precipitated crystals which consist substantially of said enantiomorphic component are then separated from the solution.

Preferably between 2% by weight to 12% by weight of the racemic mixture are added in the form of one of the enantiomorphic components of said racemic threonine. Its amount depends upon the temperatures selected for heating and cooling and is adjusted to such an amount that substantially only one of the enantiomorphic substances precipitates on cooling and usually no precipitation of racemic threonine occurs.

The difference in temperature between the warm solution containing the racemic mixture and an excess of one of the enantiomorphic components thereof and the cooled supersaturated solution from which said one enantiomorphic component precipitates is preferably between about 20° C. and 60° C. Excellent results are, for instance, obtained by preparing a warm solution at 80° C. and cooling said solution to 20° C. whereby the temperature difference is about 60° C. One may, of course, operate at other temperatures, for instance, at boiling temperature or even at higher temperatures under pressure. One may heat, for instance, the solution of the racemic acid to 60° C. and may then cool the mixture, after addition of one of the enantiomorphic components, to 15° C. without departing from the principle of this invention.

After addition of the enantiomorphic compound to the solution of racemic threonine and cooling the solution, the precipitated optically active compound is removed from said solution by filtration, centrifuging, or other means of separating solid substances from liquids.

The mother liquors obtained after separation, for instance, by filtration of the crystalline enantiomorphic component may be utilized for separating the optical antipode of said enantiomorphic component. For this purpose, said mother liquor need only be again heated to the desired temperature whereupon an amount of racemic threonine corresponding preferably approximately to the amount of enantiomorphic component previously precipitated and removed from the original solution is added to and dissolved in said warm mother liquor. On cooling said replenished solution, the optical antipode of the previously precipitated enantiomorphic component precipitates and is removed in crystalline form. The addition of racemic threonine to the warm mother liquors disturbs the equilibrium so that said solution contains more of said optical antipode than originally present.

After filtration of said precipitated optical antipode, heating of the mother liquors, and addition of corresponding amounts of racemic threonine, the hot mother liquor has about the same composition as in the beginning of the procedure, i.e., it contains an excess of the enantiomorphic component which was removed by the first crystallization procedure. On cooling, again said first precipitated optically active component is precipitated. On repeating this procedure, alternately, the one or the other of the optical antipodes of threonine is removed. It is evident that in this manner direct resolution of given amounts of racemic threonine can be effected.

Should the precipitated enantiomorphic component contain racemic threonine, its content in the precipitate can be readily determined by measuring the rotatory power of said precipitate. The difference between the rotatory power determined and the rotatory power of the pure enantiomorphic component indicates the amounts of racemic threonine present in the precipitate. Purification of such a precipitate containing racemic threonine is readily effected by adding 5 parts of volume of water to each one part by weight of racemic threonine present in said precipitate, heating the mixture to about 80° C., and cooling to 20° C. Racemic threonine remains in solution while the optically active threonine crystallizes.

Since it is possible to convert the D(+)-threonine recovered in this manner from solutions of racemic threonine into L(—)-threonine according to the method of Elliot, "Journal Chemical Society," 1950, page 62, the present process permits quantitative recovery and conversion of racemic threonine into the physiologically important L(—)-threonine.

An important factor to assure that the process of resolving DL-threonine according to the present invention is carried out in a proper fashion, is the concentration of racemic threonine in the cooled supersaturated solution. About 20 g. to 25 g. of said racemic threonine should remain in solution in 100 cc. of water at 20° C. after allowing the one optically active component to crystallize while keeping the solution at said temperature for one hour. Best results are obtained when adjusting the concentration of racemic threonine in the warm solution in such a manner that the racemic compound, at the temperature to which it is subsequently cooled, just remains in supersaturated solution.

It is possible to use more highly concentrated solutions of racemic threonine, when employing more readily soluble salts of threonine, such as the chlorohydrate. For this purpose, a mixture of such water soluble salts of racemic threonine and of racemic threonine itself is dissolved in water at elevated temperature, one of the enantiomorphic components of said racemic threonine is added to said warm solution, and the solution is then cooled whereby a larger amount of said one optically active component crystallizes than in the absence of the threonine salt.

Said mixture of soluble salt and racemic threonine may be prepared by adding racemic threonine to warm water and dissolving the same by partly acidifying the mixture by means of the acid, the salt of which one wishes to use. Likewise, one may dissolve a water soluble salt of racemic threonine in warm water and add to said solution an adequate amount of alkalizing agent, such as alkali hydroxide or carbonate. Said solution partly converts said salt into free racemic threonine, thus producing a mixture of salt and free threonine in solution.

The new resolving process according to this invention is not limited to the precise mode of manufacture hereinafter described in the examples nor to the precise order of addition of the enantiomorphic components, whether first the D-form and then the L-form is added or vice versa.

The following examples serve to illustrate the invention without, however, limiting the same thereto.

*Example 1*

1 g. of L-threonine of 9 g. of DL-threonine are dissolved in a flask in 30 cc. of water of 80° C. The solution is cooled to 20° C. by placing the flask into a water bath of 20° C. and stirring the solution. As soon as the temperature of the solution corresponds to that of the water bath, crystallization is induced by scratching and rubbing with a glass rod. The mixture is allowed to stand at 20° C. for about one hour whereby it is stirred from time to time. The precipitated crystals are filtered off and are dried.

Yield: 2.07 g. of L-threonine having a rotatory power $[\alpha]_D^{20}$: —26° (c.: 1% in water).

*Example 2*

2 g. of L-threonine and 18 g. of DL-threonine are dissolved in 64.2 cc. of N hydrochloric acid whereby 38% of the amino acids are converted into the chlorohydrate, and 15.8 cc. of water are added. The solution is heated to 70–80° C. 80 cc. of absolute boiling ethanol are added, i.e., an amount insufficient to cause precipitation at said temperature. The solution is cooled to 20° C. and crystallization is induced in the same way as described in Example 1. After maintaining the temperature of the solution at 20° C. for one hour, the precipitated crystals are filtered off. The crystals are washed on the filter with 3 cc. of 50% alcohol and subsequently with 3 cc. of absolute alcohol. The washed crystals are dried at 80° C. yielding 3.235 g. of L(—)-threonine having a rotatory power $[\alpha]_D^{20}$: —28.5° (c.: 1% in water).

*Example 3*

1 g. of L-threonine and 9 g. of DL-threonine are dissolved in 10 cc. of water and 3 cc. of 10 N hydrochloric acid by heating to 70° C. The solution is cooled, crystallization is induced, the crystals are filtered, washed, and dried in the same way as described in Example 2.

Yield: 1.735 g. of L(—)-threonine having a rotatory power $[\alpha]_D^{20}$: —28° (c.: 1% in water).

*Example 4*

0.7 g. of L-threonine and 9 g. of DL-threonine are dissolved under the same conditions and with the same amounts of water and 10 N hydrochloric acid as described in Example 3. The solution is cooled, crystallization is induced, the crystals are filtered, washed, and dried in the same manner as described in Example 2. 1.220 g. of L-threonine having a rotatory power of $[\alpha]_D^{20}$: —28° (c.: 1% in water) are recovered.

*Example 5*

2.07 g. of DL-threonine are added to the mother liquors obtained after separation of L-threonine according to Example 1. The mixture is heated to 80° C. The resulting solution is cooled to 20° C. Crystallization is induced and the mixture is allowed to stand at 20° C. for one hour. The precipitated crystals are filtered off and dried. 2.950 g. of D-threonine having a rotatory power $[\alpha]_D$: +17° (c.: 1% in water). These crystals are again dissolved in 6 cc. of water by heating to 80° C. while stirring, and allowed to cool to 20° C. The crystals are filtered off, washed in absolute alcohol, and dried.

Yield: 1.7 g. having a rotatory power $[\alpha]_D$: +28° (c.: 1% in water). This compound represents substantially pure D-threonine.

The mother liquors resulting after separation of said D-threonine are again mixed with 2.07 g. of DL-threonine. The mixture is heated to 80° C., the solution is cooled to 20° C. Crystallization is induced as described in the preceding examples. The mixture is allowed to stand at 20° C. for one hour. The precipitated crystals are filtered off and dried. About 1.9 g. of L-threonine are obtained after reprecipitation as described above for the recovery of D-threonine, said L-threonine having a rotatory power $[\alpha]_D^{20}$: —27.5° (c.: 1% in water).

When continuing this cycle of operation with the filtrate obtained in each preceding step, alternately D- and L-threonine are recovered in amounts which approximately correspond to the amounts of DL-threonine added to the mother liquors each time the process is repeated.

*Example 6*

0.35 g. of L-threonine and 6.1 g. of DL-threonine chlorohydrate are dissolved in 4 cc. of water at 70–80°

C. 245 cc. of 10 N sodium hydroxide solution are added thereto to cause conversion of 62% of the chlorohydrate into the free amino acid. The mixture is cooled to 20° C., crystallization is induced, the crystals are filtered, washed, and dried in the same manner as described in Example 2. 0.636 g. of L(—)-threonine having a rotatory power $[\alpha]_D^{20}$: —28° (c.: 1% in water), are obtained.

Of course, many changes and variations in the amounts of racemic threonine and its water soluble salts dissolved, in the addition of its enantiomorphic components, in the dissolving and cooling temperatures, in the recovery of the precipitated and crystallized optically active components and their purification, and the like may be made by those skilled in the art in accordance with the principles set forth herein and in the claims annexed hereto.

The prefixes "D-," "L-," and "DL-" employed herein conform to the IUPAC-rules as they are recommended on page 4522 of "Chemical and Engineering News" of October 27, 1952.

We claim:

1. In a process of resolving racemic DL-threonine into its optically active components, the steps comprising dissolving racemic threonine at elevated temperature in water, to produce a substantially maximum supersaturated non-crystallizing solution at room temperature, adding to said solution, while at elevated temperature, between about 2% by weight and about 12% by weight, calculated for the racemic threonine present in said solution, of one of the enantiomorphic components of said racemic threonine, thereby causing dissolution of said added component in said solution, cooling said solution to about room temperature, allowing the optically active threonine corresponding to said added enantiomorphic compound to spontaneously crystallize, removing from the mother liquor said crystallized optically active threonine, the elevated temperature at which said racemic threonine and said enantiomorphic component are dissolved, being between about 20° C. and about 60° C. higher than the temperature to which the resulting solution is cooled, heating said mother liquor to said elevated temperature, adding to said heated mother liquor racemic threonine in an amount approximately corresponding to the crystallized and removed amount of optically active threonine, thereby causing dissolution of said added racemic threonine in said heated mother liquor, cooling the resulting solution to about room temperature, allowing the optically active antipode of the previously precipitated optically active threonine to spontaneously crystallize, removing from the mother liquor said crystallized optically active antipode and repeating said steps of heating the mother liquor, adding thereto racemic threonine in an amount corresponding approximately to the crystallized and removed amount of optically active threonine, cooling said solution to about room temperature, allowing the optically active component of said racemic threonine formed by each cycle of operation to spontaneously crystallize, and removing said crystallized optically active component from the mother liquors.

2. In a process of resolving racemic DL-threonine into its optically active components, the steps comprising dissolving racemic threonine and a water soluble salt thereof at elevated temperature in water, the amount of said racemic threonine dissolved in said solution being sufficient to produce, at room temperature, a substantially maximum supersaturated non-crystallizing solution of said threonine in said salt solution, adding to said solution, while at elevated temperature, between about 2% by weight and about 12% by weight, calculated for the racemic threonine present in said solution, of one of the enantiomorphic components of said racemic threonine, thereby causing dissolution of said added component in said solution, cooling said solution to about room temperature, allowing the optically active threonine corresponding to said added enantiomorphic component to spontaneously crystallize, and removing from the mother liquor said crystallized optically active threonine, the elevated temperature at which said racemic threonine and said enantiomorphic component are dissolved, being between about 20° C. and about 60° C. higher than the temperature to which the resulting solution is cooled.

3. In a process of resolving racemic DL-threonine into its optically active components, the steps comprising adding racemic threonine at elevated temperature to water, adding to said mixture an acid forming with said racemic threonine a water soluble salt, the amount of said acid being insufficient to completely convert said racemic threonine into its salt, the amount of free racemic threonine present in said solution of salt and amino acid being sufficient to produce, at room temperature, a substantially maximum supersaturated non-crystallizing solution of said racemic threonine in said salt solution, adding to said solution, while at elevated temperature, between about 2% by weight and about 12% by weight, calculated for the racemic threonine present in said solution, of one of the enantiomorphic components of said racemic threonine, thereby causing dissolution of said added component in said solution, cooling said solution to about room temperature, allowing the optically active threonine corresponding to said added enantiomorphic component to spontaneously crystallize, and removing from the mother liquor said crystallized optically active threonine, the elevated temperature at which said racemic threonine and said enantiomorphic component are dissolved, being between about 20° C. and about 60° C. higher than the temperature to which the resulting solution is cooled.

4. In a process of resolving racemic DL-threonine into its optically active components, the steps comprising dissolving a water soluble salt of racemic threonine at elevated temperature in water, adding to said salt solution an alkalizing agent in an amount insufficient to completely convert the salt into free racemic threonine, the amounts of free racemic threonine present in said solution of salt and threonine being sufficient to produce at room temperature a substantially maximum supersaturated non-crystallizing solution of said racemic threonine in said salt solution, adding to said solution, while at elevated temperature, between about 2% by weight and about 12% by weight, calculated for the racemic threonine present in said solution, of one of the enantiomorphic components of said racemic threonine, thereby causing dissolution of said added component in said solution, cooling said solution to about room temperature, allowing the optically active threonine corresponding to said added enantiomorphic component to spontaneously crystallize, and removing from the mother liquor said crystallized optically active threonine, the elevated temperature at which said racemic threonine and said enantiomorphic component are dissolved, being between about 20° C. and about 60° C. higher than the temperature to which the resulting solution is cooled.

5. In a process of resolving racemic DL-threonine into its optically active components, the steps comprising dissolving a racemic threonine and a water soluble salt thereof at elevated temperature in water, the amount of said racemic threonine dissolved in said solution being sufficient to produce, at room temperature, a substantially maximum supersaturated, non-crystallizing solution of said racemic threonine in said salt solution, adding to said solution, while at elevated temperature, between about 2% by weight and about 12% by weight, calculated for the racemic threonine present in said solution, of one of the enantiomorphic components of said racemic threonine, thereby causing dissolution of said added component in said solution, cooling said solution to about room temperature, allowing the optically active threonine corresponding to said added enantiomorphic component to spontaneously crystallize, removing from the mother liquor said crystallized optically active threonine, the elevated temperature at which said racemic threonine and said enantiomorphic component are dissolved, being between about 20° C. and about 60° C. higher than the temperature to which the resulting solution is cooled, heating said mother liquor to said elevated temperature, adding to said heated mother liquor racemic threonine in an amount approximately corresponding to the crystallized and removed amount of optically active threonine, thereby causing dissolution of said added racemic threonine in said heated mother liquor, cooling the resulting solution to about room temperature, allowing the optically active antipode of the previously precipitated optically active threonine to spontaneously crystallize, removing from the mother liquor said crystallized optically active antipode and repeating said steps of heating the mother liquor, adding thereto racemic threonine in an amount corresponding approximately to the crystallized and removed amount of optically active threonine, cooling said solution to about room temperature, allowing the optically active component of said racemic threonine formed by each cycle of operation to spontaneously crystallize, and removing said crystallized optically active component from the mother liquor.

References Cited in the file of this patent

UNITED STATES PATENTS 2,734,919    Amiard et al. _____ Feb. 14, 1956

OTHER REFERENCES

Houben: Die Methoden der Organischen Chemie, vol. 2, page 1065 (1925).

Gilman: Organic Chemistry, vol. 1, John Wiley and Sons, New York (1938).

Duschinsky: Journ. of Chemistry and Industry Society, vol. 53 (1934), page 10.